(12) United States Patent
Holzmann

(10) Patent No.: US 7,216,222 B2
(45) Date of Patent: May 8, 2007

(54) SYSTEM AND METHOD FOR WRITING DATA FROM A STORAGE MEANS TO A MEMORY MODULE IN A SOLID STATE DISK SYSTEM

(75) Inventor: Richard Holzmann, Katy, TX (US)

(73) Assignee: Texas Memory Systems, Inc., Houston, TX (US)

( * ) Notice: Subject to any disclaimer, the term of this patent is extended or adjusted under 35 U.S.C. 154(b) by 455 days.

(21) Appl. No.: 10/697,591

(22) Filed: Oct. 30, 2003

(65) Prior Publication Data

US 2005/0097308 A1 May 5, 2005

(51) Int. Cl.
*G06F 15/177* (2006.01)
(52) U.S. Cl. ................. 713/1; 713/2; 711/111
(58) Field of Classification Search ........... 713/1, 713/2; 711/111
See application file for complete search history.

(56) References Cited

U.S. PATENT DOCUMENTS

| | | | | |
|---|---|---|---|---|
| 5,239,644 A | * | 8/1993 | Seki et al. | 710/52 |
| 5,261,072 A | * | 11/1993 | Siegel | 710/22 |
| 5,420,998 A | * | 5/1995 | Horning | 711/113 |
| 5,475,859 A | * | 12/1995 | Kamabayashi et al. | 710/5 |
| 5,592,630 A | * | 1/1997 | Yamagami et al. | 711/117 |
| 5,668,970 A | * | 9/1997 | Cowart et al. | 711/206 |
| 5,909,692 A | * | 6/1999 | Yanai et al. | 711/4 |
| 5,933,630 A | * | 8/1999 | Ballard et al. | 713/1 |
| 6,065,100 A | * | 5/2000 | Schafer et al. | 711/137 |
| 6,175,898 B1 | * | 1/2001 | Ahmed et al. | 711/137 |
| 6,347,370 B1 | * | 2/2002 | Grimsrud | 713/1 |
| 6,389,509 B1 | * | 5/2002 | Berenguel et al. | 711/113 |
| 6,463,509 B1 | * | 10/2002 | Teoman et al. | 711/137 |
| 6,715,035 B1 | * | 3/2004 | Colglazier et al. | 711/118 |
| 6,748,467 B2 | * | 6/2004 | Yamamoto | 710/65 |
| 2002/0069354 A1 | * | 6/2002 | Fallon et al. | 713/2 |

* cited by examiner

*Primary Examiner*—Chun Cao
*Assistant Examiner*—Vincent Tran

(57) ABSTRACT

The invention is directed to a system and method for writing data from a non-volatile storage means to a volatile memory module within a solid state disk system, upon start-up. The system preferably uses a control module coupled to a memory module and storage means. The control module preferably maintains a load priority queue for recording data requests made by a computer network connected to the system. During start up of the solid state disk system, the control module examines the load priority to queue and determines if any of the data requests are applicable to data segments already loaded during the startup process.

13 Claims, 3 Drawing Sheets

SYSTEM AND METHOD FOR WRITING DATA FROM A STORAGE MEANS TO A MEMORY MODULE IN A SOLID STATE DISK SYSTEM

BACKGROUND OF THE INVENTION

1. Field of the Invention

The invention is directed generally to solid state disk systems. More specifically, the invention is directed to a system and method for writing data from a non-volatile storage means to a volatile memory module within a solid state disk system, upon start-up.

2. Description of Related Art

The use of solid state disk (SSD) systems allows organizations to obtain increased returns from their IT hardware investments. SSD systems allow centralized storage and retrieval of data and have many advantages over individual workstations or servers that use conventional storage systems, such as conventional rotating disks or tape drives. SSDs can move much larger amounts of data and process far more I/O requests, per time period, than conventional disk systems found on most server computers. This allows users to complete single data transactions much more quickly than with conventional disk systems.

SSD systems also provide greater reliability compared to disks, reducing downtime, and they allow for centralized management of data storage and performance, thereby reducing staffing needs. The scalability of a SSD system also allows a user to build a storage area network (SAN) based upon the SSD's performance capacities. This allows for consolidated management of data storage and can create a virtual, dynamic resource that can be used for specific tasks by separate business units, as needed. As a result, many businesses and other organizations and enterprises are incorporating SSD systems into their IT configurations.

Solid state disk systems typically comprise a temporary memory module, such as a random access memory (RAM); a battery supported power system; and a non-volatile (conventional disk) storage means. In the event of a power outage or other shutdown, data is automatically copied from the memory module to the storage means. When power is restored, the data is re-written from the storage means to the memory module upon start-up. Solid state disk systems may also comprise control devices that allow users to periodically backup data from the memory module to the storage means. Solid state disk systems may also comprise communication controllers, such as Fibre Channel (FC) controllers, Ethernet mechanisms or SCSI controllers for managing data communication with external computing devices.

Despite their many advantages, one limitation of SSD systems is the time required for data to be re-written to the memory module upon start-up. When data is copied to the storage means, it is arranged sequentially in segments, each of which consists of a range of address units. From this sequential ordering of segments, a sequential load map may be produced. Upon start-up, the storage means re-writes data segments to the memory module in the same sequential order. If a user needs to access segments 1,000,000 to 1,000,001, for example, the user must wait anywhere from five to thirty minutes before the storage means writes all of the data to the memory module. As a result, the effect of a power outage or other shutdown on the availability of the SSD system often significantly exceeds the length of the outage itself.

As a result, there is a great need in the art for a system and method for writing data from a storage means to a memory module in a solid state disk system, which allows users to immediately access needed data. The system and method must provide for accepting requests from external devices and for writing data from the storage means to the memory module in a non-sequential order according to such requests. Once a requested segment is loaded, sequential re-writing of data from the storage means to the memory module must continue without interruption and without duplication of the requested segments.

SUMMARY OF THE INVENTION

The present invention is directed to a system and method for writing data from a storage means to a memory module in a solid state disk system, upon start-up. The invention overcomes limitations of prior SSD systems, by accepting requests from external devices and writing data from the storage means to the memory module in a non-sequential order according to such requests. According to the invention, once a requested segment is loaded, sequential re-writing of data from the storage means to the memory module may continue without interruption and without duplication of the requested segments.

DETAILED DESCRIPTION

Figure 1:
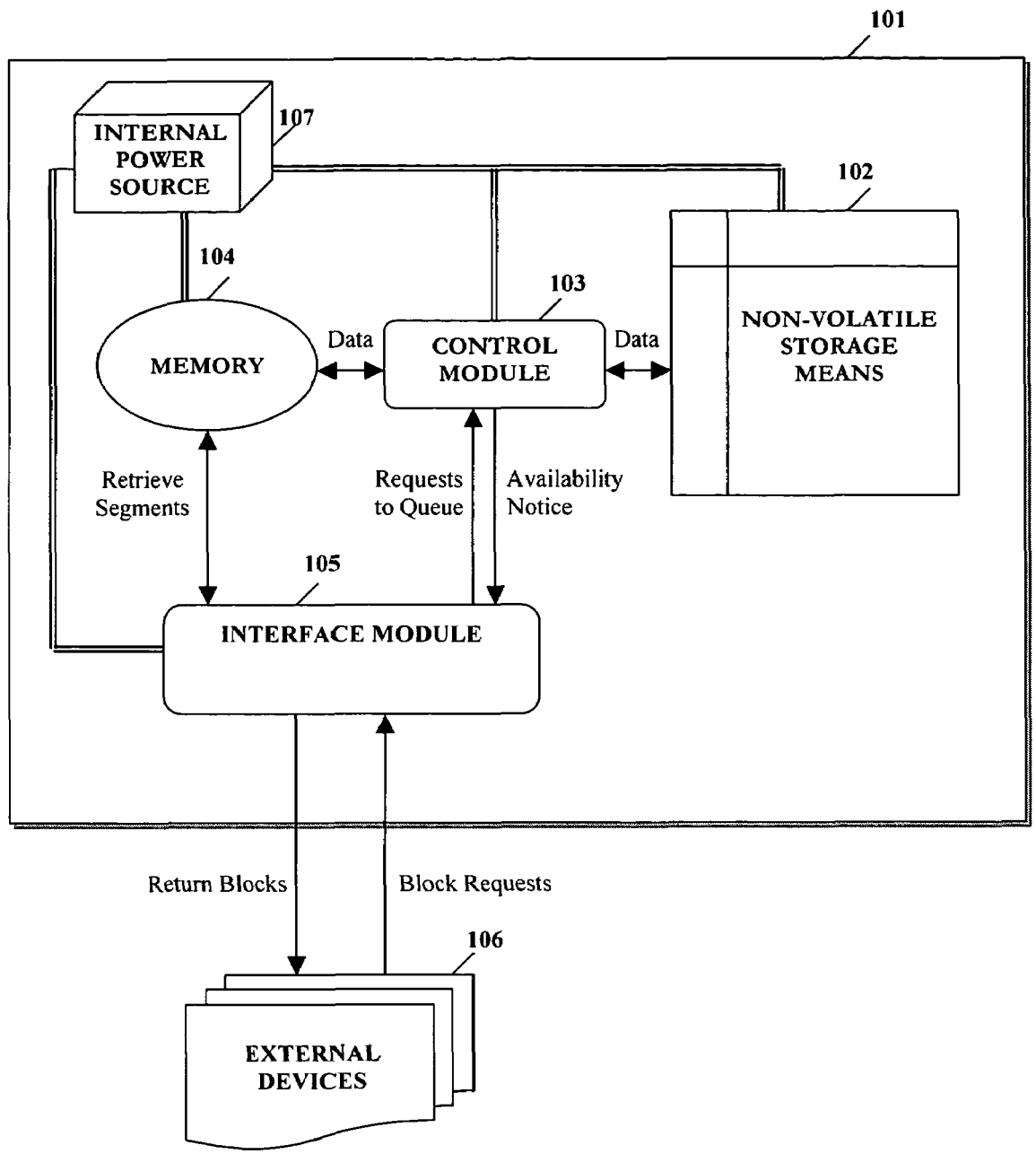
FIG. 1 is a functional diagram illustrating a system for writing data from a storage means to memory in a solid state disk system, in accordance with the present invention.

Referring now to the figures, the present invention is directed to a system and method for writing data from a storage means to a memory module in a solid state disk system, upon start-up. FIG. 1 is a block diagram illustrating the component parts of the invented system and the function of each component part. The invented system comprises a solid state disk system 101 having a non-volatile storage means 102, a control module 103, a memory portion 104, an interface module 105 that communicates with external devices 106, and an internal power supply 107. The storage means 102 comprises a means for electronic storage of data that does not need to be periodically refreshed. The storage means 102 may comprise, for example, a hard disk system. The storage means may alternatively comprise a non-volatile storage means, such as a semiconductor memory array, a flash memory array, or a flash disk.

The control module 103 facilitates the copying of data to the storage means 102 from the memory module 104, and the re-writing of data from the storage means 102 to the memory module 104. The control module 103 automatically manipulates the copying and re-writing of data between the storage means 102 and the memory module 104, according to the method described with reference to FIG. 2. The control module 103 also maintains a sequential listing of data segments, as stored by the storage means 102, that denotes which segments have been written to memory. The control module also maintains a load priority queue for data segment requests that it receives from the interface module 105. The control module 103 may also allow for manual manipulation of the copying and re-writing of data. The control module 103 preferably comprises a microprocessor-controlled solid state disk controller, the elements of which are readily known to those skilled in the art.

The memory portion 104 comprises at least one direct-access memory module for holding data in current or recent use by external devices 106. The memory module 104 is more quickly accessible, and performs read and write processing functions more quickly, than the non-volatile storage means 102. The memory portion 104 preferably comprises at least one random-access memory (RAM) module. A RAM module may comprise dynamic random-access memory (DRAM), synchronous DRAM (SDRAM) or other appropriate technology.

The interface module 105 manages communication with external devices 106. The interface module 105 processes data requests from external devices 106 and sends and receives commands with the control module 106. With respect to the current invention, the interface module 105 receives requests from external devices 106 for particular data blocks. The communication module translates these blocks into segments, sends data requests to a load priority queue maintained by the control module 103 and receives data segment availability notices from the control module 103 after each data segment is written from storage means 102 to memory 104 after start-up.

The interface module 105 also processes read and write commands from memory 104, in order to retrieve requested data segments from memory 104 and return them to external devices 106. The interface module 105 may communicate with external devices 106 via Ethernet, SCSI or FC. Preferably, the interface module 105 communicates with external devices 106 via FC. The interface module 105 may comprise a general integrated circuit and associated circuitry, or may comprise several integrated circuits and associated circuitry, such that it may process requests from multiple applications. Alternatively, the interface module 105 may comprise an application-specific integrated circuit (ASIC), such as a QLogic Fiber Channel ASIC. Alternatively, the interface module 105 and control module 103 may be combined on a single integrated circuit.

External devices 106 comprise computing devices having central processing units that are capable of submitting commands and data requests to, and receiving requested data from, the interface module 105 via FC communication, Ethernet, SCSI or other appropriate communication means.

The internal power supply 107 comprises a temporary power supply suitable for providing adequate power to facilitate the copying of data from the memory 104 to the storage means 102 in the event that external power to the system should fail. The internal power supply 107 may comprise, for example, at least one battery, extended-life battery pack or direct current uninterrupted power supply (DC UPS). Upon shutdown or failure of external power to the system 101, the internal power supply 107 provides sufficient power for data residing in memory 104 to be copied to the storage means 102, upon prompting by the control module 103. When power is restored and start-up of the system 101 is initiated, the data is re-written from the storage means 102 to the memory 104 in accordance with the present invention.

Figure 2:
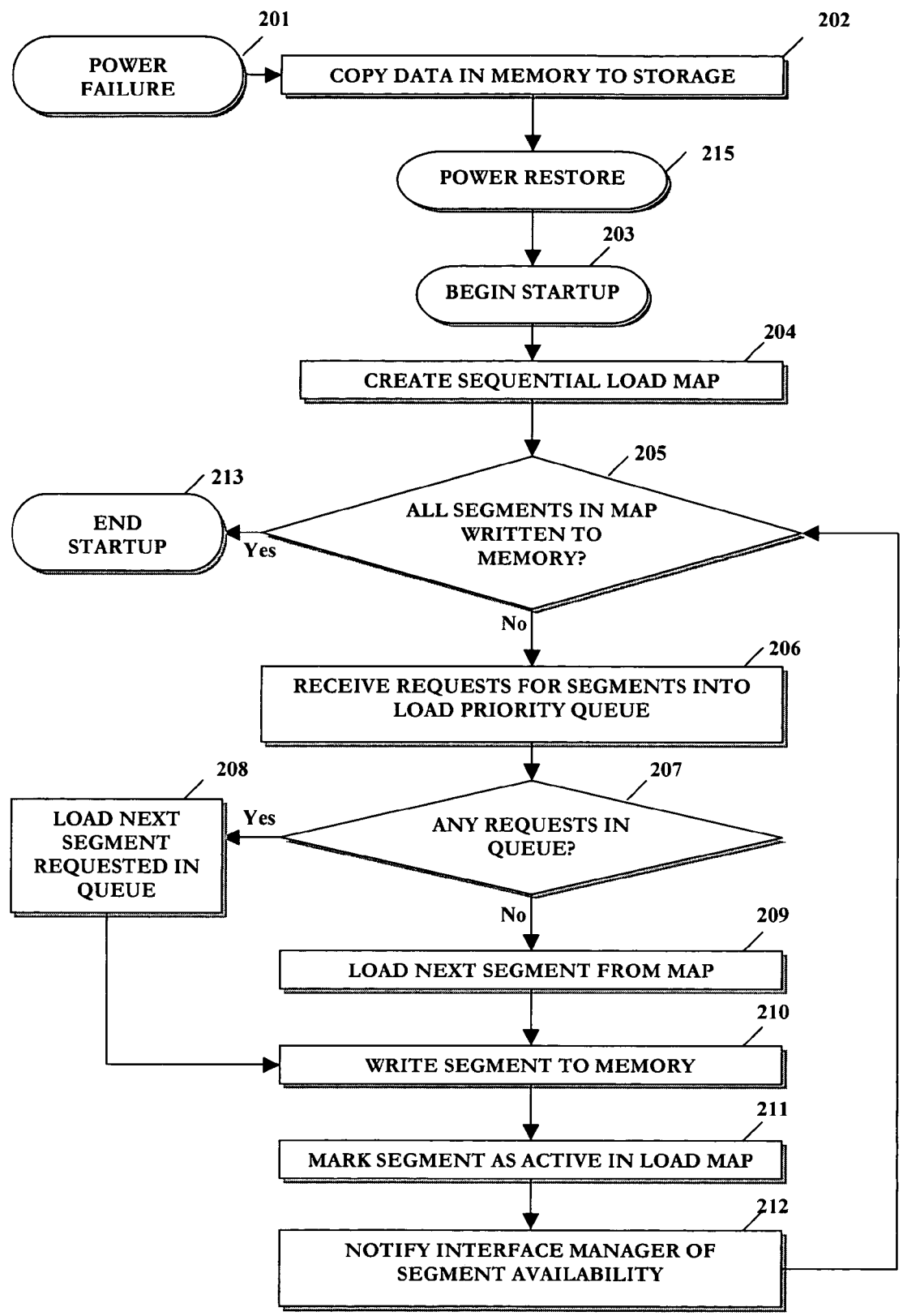
FIG. 2 is a flow diagram illustrating steps of a method for writing data from a storage means to memory in a solid state disk system, which steps are implemented via the control module illustrated in FIG. 1.

FIG. 2 is a flow diagram illustrating steps of a method for writing data from a storage means to memory in a solid state disk system, which steps are implemented via the control module illustrated in FIG. 1. In accordance with step 201, shutdown or failure of the system's external power source occurs. The system maintains power via its battery, as described above, and the control module copies data in memory to the storage means, in accordance with step 202. The data is copied in segments that are stored sequentially on the storage means. Once external power is restored to the system at step 215, the start-up process is initiated, in accordance with step 203. In accordance with step 204, the control module creates a sequential load map, which lists the data segments stored on the storage means, in the order they are stored.

In accordance with step 205, the control module then determines whether all segments in the sequential load map have been written to memory. When all segments have been written to memory, the start-up process terminates, in accordance with step 213. Where segments exist in the sequential load map that have not been written to memory, the start-up process does not terminate and proceeds to step 206. Those skilled in that art will appreciate that upon the initiation of the start-up process, all data segments in the sequential load map will not have been written to memory.

If the start-up process is not terminated, then the control module receives any requests from the interface module for particular data segments stored on the storage means, in accordance with step 206. The manner in which the interface module sends such requests is described further with reference to FIG. 3, below. The control module places these requests in a load priority queue comprising a plurality of priority positions. Request may be placed in priority positions in the order they are received, such that the first received request is placed in the highest priority position.

In accordance with step 207, the control module determines whether there are any requests for segments in the load priority queue. If at least one request is in queue, then the control module loads the data segment corresponding to the request in the highest occupied priority position of the queue, in accordance with step 208. The requested data segment is then written to memory, in accordance with step 210, and the segment is marked as active on the sequential load map, in accordance with step 211. The interface module is then notified of the segment's availability in memory, in accordance with step 212.

Where no requests exist in the load priority queue in step 207, then the control module loads the next data segment in the sequential load map, in accordance with step 209. This segment is then written to memory, in accordance with step 210, and the segment is marked as active on the sequential load map, in accordance with step 211. The interface module is then notified that the segment has been loaded into memory, in accordance with step 212.

After the control module notifies the interface module that a data segment is available in memory, the control module then checks to see if all data segments in the sequential load map have been written to memory, in accordance with step 205. This may be done either by comparison of data between the storage means and memory module(s), or by checking whether all segments listed on the sequential load map are marked as active. The method then repeats beginning with step 205 through step 212, until all data segments have been loaded to memory and the start-up process terminates in accordance with step 213.

Figure 3:
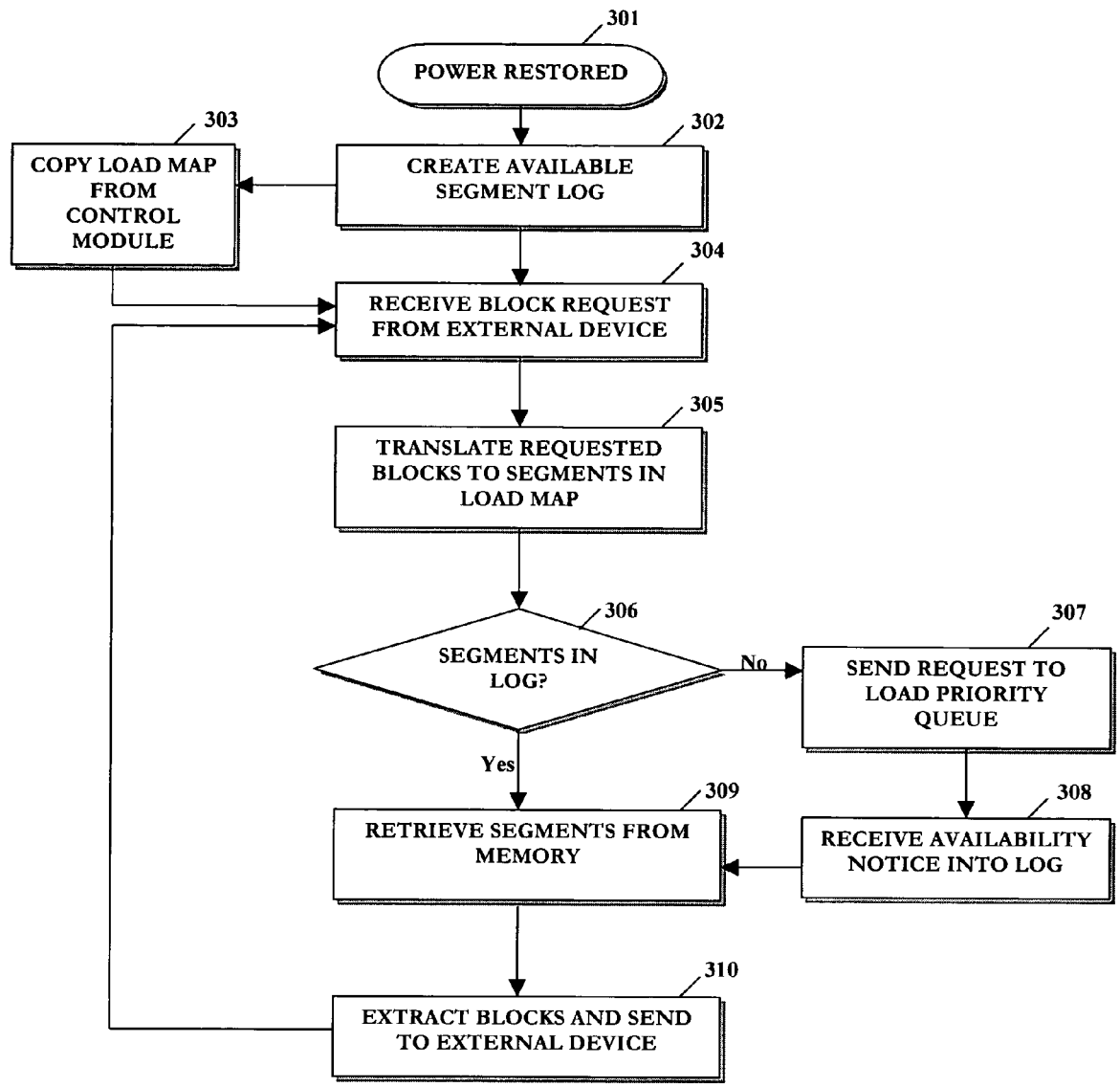
FIG. 3 is a flow diagram illustrating steps of a method for writing data from a storage means to memory in a solid state disk system, which steps are implemented via the interface module illustrated in FIG. 1.

FIG. 3 is a flow diagram illustrating steps of a method for writing data from a storage means to memory in a solid state disk system, which steps are implemented via the interface module illustrated at 105 in FIG. 1. After power is restored to the system in accordance with step 301, as described above, the communications management module creates a log for recording which data segments are available in memory, in accordance with step 302. Alternatively, the communications management module may simply re-initialize a pre-created log.

In accordance with step 304, the interface module receives a request from an external device for at least one block of data. In accordance with step 305, the interface module translates the requested blocks into their locations within data segments stored by the storage means or stored in memory. The interface module may perform this function by communicating with the control module and searching for the requested blocks in the sequential load map described above. Alternatively, the interface module may abstract a copy of the sequential load map from the control module, in accordance with step 303.

In accordance with step 306, the interface module checks to see whether the segment(s) containing the requested block(s) of data are available in memory, as recorded in the interface module's segment availability log. If the segment(s) are available, then the interface module retrieves the segment(s) from memory, in accordance with step 309. The interface module then extracts the requested data block(s) from the segment(s) and returns them to the external device, in accordance with step 310.

If the interface module determines that the needed segments are not available in memory, in accordance with step 306, then the interface module sends a request for the segments to the load priority queue maintained by the control module, in accordance with step 307. The interface module may issue separate requests for each block contained in a request received from the external device. Alternatively, the interface module may submit a single request for all blocks requested by the external device.

Once all segments contained in a request sent by the interface module have been copied into memory by the control module, according to the steps described with reference to FIG. 2, the interface module receives a notice from the control module, in accordance with step 308. The notice informs the interface module that the requested segment(s) have been copied to memory, and their availability is recorded by the interface module in its segment availability log. The interface module then retrieves the segment(s) from memory, in accordance with step 309. The interface module then extracts the requested data block(s) from the segment(s) and returns them to the external device, in accordance with step 310.

I claim:

1. A solid state disk system comprising:
a non-volatile storage media;
a memory module;
an interface module for communicating with a computer network;
a control module operatively coupled to the non-volatile storage media, the memory module, and the interface module;
a load priority queue stored by said control module for maintaining a list of data segment requests received by said interface module;
a sequential load map stored by said control module for storing the order in which data segments are copied from said non-volatile storage media to said memory module during staff-up of said solid state disk system;
said control module, in response to a shutdown event of the solid state disk system, copying data from the memory module to the non-volatile storage media;
said control module, during start-up of the solid state disk system, copying data segments from said non-volatile storage media to said memory module in the order listed in said sequential load map;
said control module, during staff-up of the solid state disk system, checking the load priority queue;
said control module, if data segments are listed in said load priority queue, temporarily stopping said copying of data segments listed in said sequential load map;
said control module copying the data segments listed in the load priority queue from the non-volatile storage media to said memory module;
said control module, after all data segments in said load priority queue have been copied, resuming said copying of data segments listed in said sequential load map.

2. The system of claim 1, wherein said memory module is a RAM module.

3. The system of claim 1, said interface module, upon receiving a read or write request from said computer network, issues a command to said control module to check the load priority queue.

4. The system of claim 3, said control module issuing a notice to said interface module when all data segments listed in the load priority queue have been copied from said non-volatile storage media to said memory module.

5. The solid state disk system of claim 1, wherein said shutdown event occurs in response to a power failure of the solid state disk system.

6. The solid state disk system of claim 1, further comprising a temporary power supply.

7. The solid state disk system of claim 6, wherein the temporary power supply comprises a battery.

8. The solid state disk system of claim 6, wherein the temporary power supply comprises a direct current uninterrupted power supply.

9. In a solid state memory system including a non-volatile storage media, a memory module, an interface module for communicating with a computer network, and a control module, a method, comprising:
said control module copying data from said memory module to said non-volatile storage media in response to a shutdown event;
said control module creating a sequential load map identifying the order that segments will be copied from said non-volatile storage media to said memory module;
said control module copying segments from said non-volatile storage media to said memory module according to said sequential load map in response to a startup of said solid state memory system;
said control module receiving a request for data segments from said interface module and placing said data segments into a load priority queue;
said control module checking the load priority queue to determine if data segments are stored in said load priority queue, and if segments are stored in said queue, copying said data segments from said non-volatile storage means to said memory module before continuing to copy the data segments listed in said sequential load map.

10. The method of claim 9, further comprising the steps of:
said control module, after copying all segments listed in said load priority queue, issuing a notice to said interface module that the requested data segment is available for access.

11. The method of claim 9, further comprising the steps of:

said interface module receiving a data access request from the computer network and issuing a command to said control module to check the load priority queue.

12. The method of claim 9, wherein the shutdown event occurs in response to a power failure of the solid state disk system.

13. The method of claim 12, wherein the startup of the solid state disk system occurs in response to power being restored to the solid state disk system.

* * * * *